United States Patent
Casellas et al.

(10) Patent No.: US 11,142,454 B2
(45) Date of Patent: Oct. 12, 2021

(54) HYDROGEN STORE COMPRISING A COMPOSITE MATERIAL AND METHOD FOR THE PRODUCTION THEREOF

(71) Applicant: GKN Sinter Metals Engineering GmbH, Radevormwald (DE)

(72) Inventors: Antonio Casellas, Siegburg (DE); Klaus Dollmeier, Westhausen (DE); Eberhard Ernst, Eichenzell (DE); Markus Laux, Radevormwald (DE); Lars Wimbert, Schwelm (DE)

(73) Assignee: GKN Sinter Metals Engineering GmbH, Radevormwald (DE)

( * ) Notice: Subject to any disclaimer, the term of this patent is extended or adjusted under 35 U.S.C. 154(b) by 681 days.

(21) Appl. No.: 15/307,243

(22) PCT Filed: May 4, 2015

(86) PCT No.: PCT/EP2015/059749
§ 371 (c)(1),
(2) Date: Oct. 27, 2016

(87) PCT Pub. No.: WO2015/169766
PCT Pub. Date: Nov. 12, 2015

(65) Prior Publication Data
US 2017/0044012 A1 Feb. 16, 2017

(30) Foreign Application Priority Data
May 5, 2014 (DE) ............... 10 2014 006 369.0

(51) Int. Cl.
*B32B 9/00* (2006.01)
*C01B 3/00* (2006.01)

(52) U.S. Cl.
CPC ............ *C01B 3/0078* (2013.01); *Y02E 60/32* (2013.01); *Y10T 428/30* (2015.01)

(58) Field of Classification Search
CPC ........ C01B 31/04; Y10T 428/30; B82Y 30/00
USPC ............................................. 428/408; 423/448
See application file for complete search history.

(56) References Cited

U.S. PATENT DOCUMENTS

| | | | |
|---|---|---|---|
| 4,829,772 A | 5/1989 | Bogdanovi et al. | |
| 5,360,461 A | 11/1994 | Meinzer | |
| 5,527,638 A | 6/1996 | Kinoshita et al. | |
| 5,653,951 A * | 8/1997 | Rodriguez | B01D 53/02 206/0.7 |
| 6,610,445 B1 | 8/2003 | Moriwaki et al. | |

(Continued)

FOREIGN PATENT DOCUMENTS

| | | |
|---|---|---|
| DE | 3639545 C1 | 6/1988 |
| DE | 60030221 T2 | 7/2007 |

(Continued)

OTHER PUBLICATIONS

PCT International Search Report for corresponding International Application No. PCT/EP2015/059749, dated Aug. 6, 2015.

(Continued)

*Primary Examiner* — Daniel H Miller
(74) *Attorney, Agent, or Firm* — Quarles & Brady LLP

(57) ABSTRACT

The present invention concerns a hydrogen store comprising a composite material including a hydrogenable material, a method for producing the hydrogen store and a device for producing the hydrogen store.

17 Claims, 2 Drawing Sheets

(56) References Cited

U.S. PATENT DOCUMENTS

Figure 1:
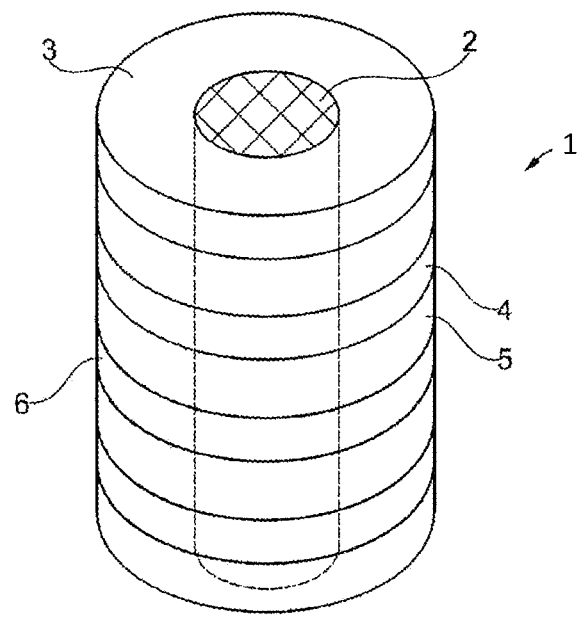

| | | |
|---|---|---|
| 2006/0030483 A1 | 2/2006 | Jang |
| 2006/0237688 A1 | 10/2006 | Zimmermann |
| 2007/0295617 A1 | 12/2007 | Zimmermann |
| 2009/0255831 A1 | 10/2009 | Zimmermann |
| 2010/0183914 A1 | 7/2010 | Toia et al. |
| 2011/0297879 A1* | 12/2011 | Jorgensen ............... B01J 2/006 252/188.25 |
| 2012/0077020 A1 | 3/2012 | Muramatsu et al. |
| 2012/0141369 A1 | 6/2012 | Zimmermann |
| 2013/0136684 A1 | 5/2013 | Wu et al. |

FOREIGN PATENT DOCUMENTS

| | | |
|---|---|---|
| DE | 102014006367 A1 | 11/2015 |
| DE | 102014006379 A1 | 11/2015 |
| EP | 0632513 A1 | 1/1995 |
| JP | S59219429 A | 12/1984 |
| WO | 2007/147260 A1 | 12/2007 |
| WO | 2008/148778 A1 | 12/2008 |

OTHER PUBLICATIONS

The State Intellectual Property Office of People's Republic of China, Third Office Action, Application No. 201580036776.1, dated Apr. 1, 2019, 19 pages.

* cited by examiner

HYDROGEN STORE COMPRISING A COMPOSITE MATERIAL AND METHOD FOR THE PRODUCTION THEREOF

This application represents the U.S. national stage entry of PCT International Application No. PCT/EP2015/059749 filed May 4, 2015, which claims priority to German Patent Application No. 10 2014 006 369.0 filed May 5, 2014, the disclosures of which are incorporated herein by reference in their entirety and for all purposes.

The present invention relates to a hydrogen storage means comprising a composite material comprising a hydrogenatable material, to a process for producing the hydrogen storage means, and to an apparatus for producing the hydrogen storage means.

One of the major challenges in the 21st century is the provision of alternative energy sources. As is well-known, the resources of fossil energy carriers, such as mineral oil or natural gas, are limited. Hydrogen is an alternative of interest here. Hydrogen ($H_2$) in itself is not an energy source, but first has to be prepared with utilization of other energy sources. By contrast with power generated directly by means of solar energy, for example, hydrogen, however, can be stored and transported. Moreover, hydrogen can be converted back to energy in different ways, for example in a fuel cell or by direct combustion. The only waste product formed is water. However, a disadvantage when working with hydrogen is that it is readily combustible, and mixing with air gives rise to highly explosive hydrogen/oxygen mixtures. Safe storage for transport or storage as well is thus a great challenge.

Hydrogen cannot easily be stored in a hydrogen storage means and then recovered again, since hydrogen has the smallest molecules of all gases. US 2006/0030483 A1 describes hollow microbeads which are said to be hydrogen storage means. US 2012/0077020 A1 and US 2013/0136684 A1 disclose the use of carbon as matrix material in hydrogen storage means. The storage of hydrogen in an electrode of a battery is elucidated in DE 60 030 221 T2.

It is an object of the invention to provide a hydrogen storage means having improved properties over the prior art, especially having a prolonged lifetime.

A hydrogen storage means having the features of claim 1, a process for producing a hydrogen storage means having the features of claim 12 and an apparatus having the features of claim 16 are proposed. Advantageous features, configurations and developments will be apparent from the description which follows, the figures and also the claims, without restriction of individual features from a configuration thereto. Instead, one Or more features from one configuration can be combined with one or more features of another configuration to give further configurations. More particularly, the respective independent claims can also each be combined with one another. Nor should the wording of the independent claims be regarded as a restriction of the subject matter claimed. One or more features of the claim wording can therefore be exchanged or else omitted, but may additionally also be added on. It is also possible to use the features cited with reference to a specific working example in generalized form as well, or likewise to use them in other working examples, especially applications.

The invention relates to a hydrogen storage means comprising a composite material comprising a hydrogenatable material, wherein the composite material comprises, in a first region, at least one polymeric matrix into which the hydrogenatable material is embedded, and, in a second region different than the first region, comprises one or more layers, wherein one of the layers has at least one of the following principal functions: primary hydrogen storage, primary heat conduction and/or primary gas conduction.

Further functions that may be assigned to a layer relate, for example, to support or stabilization of a composite region in one or more directions, flexibility, preferably elasticity, in one or more directions, strength in one or more directions, inter alia.

What the term 'layers' means in the present application is preferably that a material is, or else two or more materials are, arranged in a lamina and this can be delimited as a lamina from a direct environment. For example, different materials may be poured successively one on top of another in a loose arrangement, such that adjacent layers are in direct contact. In a preferred configuration, the composite material comprising the hydrogenatable material may form a hydrogenatable layer which may be arranged directly adjacent to a thermally conductive layer, such that the heat which arises on absorption of hydrogen and/or release of hydrogen can be released from the hydrogenatable material directly to the adjacent layer.

The principal function of at least one of the following functions: 'primary hydrogen storage', 'primary heat conduction' and/or 'primary gas conduction' is understood to mean that the respective layer fulfills at least this function as a main object in the second region of the composite material. For instance, it is possible that a layer is utilized primarily for hydrogen storage, but is simultaneously also capable of providing thermal conductivity. In such a case, it is preferable that at least one other layer is present, which assumes the primary task of heat conduction, meaning that the greatest amount of heat is dissipated from the compressed material composite via this layer compared to other layers in the hydrogen storage means. In this case, in turn, it is possible to utilize the primarily gas-conducting layer, by means of which, for example, hydrogen is passed into the material composite, or else, for example, is conducted out of it. In this case, heat can also be entrained by means of the flowing fluid. The flowing fluid in the context of the present invention is hydrogen or a gas mixture comprising hydrogen in a proportion of 50% by volume or more, preferably of 60% by volume or more, especially of 70% by volume or more, preferably of 80% by volume or more, particularly of 90% by volume or 95% by volume or more. Preferably, the hydrogenatable material stores exclusively hydrogen, such that, even in the case of use of gas mixtures as fluid, essentially only hydrogen is stored.

In an illustrative configuration, a hydrogen-storing layer comprises, on one side, a layer having primary gas conduction and, on the other side, one having primary heat conduction. It is also possible, for example, for a primarily hydrogen-storing layer may have an adjacent primarily heat-conducting layer on each side. A respective profile of layers may preferably run in parallel to one another. Alternatively, there may also be penetration of layers. For example, layers may also be arranged at an angle to one another. For example, one layer may run at right angles to another layer, in which case both layers have primarily the same or different principal functions.

The term "hydrogen storage means" describes a reservoir vessel in which hydrogen can be stored. This can be done using conventional methods of saving and storage of hydrogen, for example compressed gas storage, such as storage in pressure vessels by compression with compressors, or liquefied gas storage, such as storage in liquefied form by cooling and compression. Further alternative forms of storage of hydrogen are based on solids or liquids, for example metal hydride storage means, such as storage as a chemical compound between hydrogen and a metal or an alloy, or adsorption storage, such as adsorptive storage of hydrogen in highly porous materials. In addition, for storage and transport of hydrogen, there are also possible hydrogen storage means which temporarily bind the hydrogen to organic substances, giving rise to liquid compounds that can be stored at ambient pressure, called "chemically bound hydrogen".

Hydrogen storage means may comprise, for example, metals or metal alloys which react with hydrogen to form hydrides (metal hydrides). This process of hydrogen storage is also referred to as hydrogenation and proceeds with release of heat. It is thus an exothermic reaction. The hydrogen stored in the hydrogenation can be released again in the dehydrogenation. The supply of heat is necessary here, since dehydrogenation is an endothermic reaction. A corresponding hydrogen storage means can thus have two extreme states: 1) the hydrogen storage material is fully laden with hydrogen. The material is completely in the form of its hydride; and 2) the hydrogen storage material does not store any hydrogen, and so the material takes the form of the metal or metal alloy.

A hydrogen storage means in the context of the present invention comprises a housing and a composite material arranged therein, which assumes the function of hydrogen storage. In addition, the composite material may have further functions which are also described hereinafter.

What the term 'composite material' means in accordance with the invention is that various types of components are used in the hydrogen storage means, in order to arrange the hydrogenatable material. The composite material is formed from individual components, such as a polymeric matrix and individual layers. For the properties of the composite material, physical properties and geometry of the components are important. The composite material has preferably been compacted.

The term 'composite article' describes a composite composed of two or more materials. In this case, a first material is embedded into a second material, the matrix. The matrix may have open pores or else closed pores. The matrix is preferably porous. The embedding of one material into the other material can result, for example, in supplementary material properties otherwise possessed only by each individual component. In respect of the properties of the composite articles, physical properties and geometry of the components are important. In particular, size effects often play a role. The bonding is effected, for example, in a cohesive or form-fitting manner or a combination of the two.

In this way, for example, fixed positioning of the hydrogenatable material in the matrix can be enabled. The hydrogenatable material is thus embedded into a polymeric matrix.

According to the invention, it is possible that further components are embedded into the polymeric matrix as well as the hydrogenatable material. Further components which may be embedded into the matrix are, for example, materials for the conduction of heat and/or the conduction of gas.

The matrix may, in accordance with the invention, comprise one or more polymers and is therefore referred to as polymeric matrix. If a matrix is described in the present invention, this is understood to mean a polymeric matrix.

The matrix may therefore comprise one polymer or mixtures of two or more polymers. The matrix preferably comprises only one polymer. More particularly, the matrix itself may be hydrogen-storing. For example, it is possible to use ethylene (polyethylene, PE). Preference is given to utilizing a titanium-ethylene compound. In a preferred configuration, this can store up to 14% by weight of hydrogen.

The term "polymer" describes a chemical compound composed of chain or branched molecules, called macromolecules, which in turn consist of identical or equivalent units, called the constitutional repeat units. Synthetic polymers are generally plastics.

Through the use of at least one polymer, the matrix can impart good optical, mechanical, thermal and/or chemical properties to the material. For example, the hydrogen storage means, by virtue of the polymer, may have good thermal stability, resistance to the surrounding medium (oxidation resistance, corrosion resistance), good conductivity, good hydrogen absorption and storage capacity or other properties, for example mechanical strength, which would otherwise not be possible without the polymer.

It is also possible to use polymers which, for example, do not enable storage of hydrogen but do enable high expansion, for example polyamide or polyvinyl acetates.

According to the invention, the polymer may be a homopolymer or a copolymer. Copolymers are polymers composed of two or more different types of monomer units. Copolymers consisting of three different monomers are called terpolymers. According to the invention, the polymer, for example, may also comprise a terpolymer.

Preferably, the polymer (homopolymer) has a monomer unit which, as well as carbon and hydrogen, preferably additionally includes at least one heteroatom selected from sulfur, oxygen, nitrogen and phosphorus, such that the polymer obtained, in contrast to polyethylene, for example, is not entirely nonpolar. Preferably, the polymer is a copolymer and/or a terpolymer in which at least one monomer unit, in addition to carbon and hydrogen, additionally includes at least one heteroatom selected from sulfur, oxygen, nitrogen and phosphorus. It is also possible here that two or more monomer units have a corresponding heteroatom.

The polymer preferably has adhesive properties with respect to the hydrogen storage material. This means that it adheres well to the hydrogen storage material itself and hence forms a matrix having stable adhesion to the hydrogen storage material even under stresses as occur during the storage of hydrogen.

The adhesive properties of the polymer enable stable penetration of the material into a hydrogen storage means and the positioning of the material at a defined point in the hydrogen storage means over a maximum period of time, i.e. over several cycles of hydrogen storage and hydrogen release. A cycle describes the operation of a single hydrogenation and subsequent dehydrogenation. The hydrogen storage material should preferably be stable over at least 500 cycles, especially over at least 1000 cycles, in order to be able to use the material economically. "Stable" in the context of the present invention means that the amount of hydrogen which can be stored and the rate at which the hydrogen is stored, even after 500 or 1000 cycles, corresponds essentially to the values at the start of use of the hydrogen storage means. More particularly, "stable" means that the hydrogenatable material is kept at the position within the hydrogen storage means where it was originally introduced into the storage means.

In a preferred embodiment, the hydrogenatable material of the present invention is a low-temperature hydrogen storage material. In the course of hydrogen storage, which is an exothermic process, temperatures of up to 150° C. therefore occur. A polymer which is used for the matrix of a corresponding hydrogen storage material has to be stable at these temperatures. A preferred polymer therefore does not break down up to a temperature of 180° C., especially up to a temperature of 165° C., especially of up to 145° C.

More particularly, the polymer is a polymer having a melting point of 100° C. or more, especially of 105° C. or more, but less than 150° C., especially of less than 140° C., particularly of 135° C. or less. Preferably, the density of the polymer, determined according to ISO 1183 at 20° C., is 0.7 g/cm³ or more, especially 0.8 g/cm³ or more, preferably 0.9 g/cm³ or more, but not more than 1.3 g/cm³, preferably not more than 1.25 g/cm³, especially 1.20 g/cm³ or less. The tensile strength according to ISO 527 is preferably in the range from 10 MPa to 100 MPa, especially in the range from 15 MPa to 90 MPa, more preferably in the range from 15 MPa to 80 MPa. The tensile modulus of elasticity according to ISO 527 is preferably in the range from 50 MPa to 5000 MPa, especially in the range from 55 MPa to 4500 MPa, more preferably in the range from 60 MPa to 4000 MPa. It has been found that, surprisingly, polymers having these mechanical properties are particularly stable and have good processibility. More particularly, they enable stable coherence between the matrix and the hydrogenatable material embedded therein, such that the hydrogenatable material remains at the same position within the hydrogen storage means over several cycles. This enables a long lifetime of the hydrogen storage means.

More preferably, in the context of the present invention, the polymer is selected from EVA, PMMA, EEAMA and mixtures of these polymers.

EVA (ethyl vinyl acetate) refers to a group of copolymers of ethylene and vinyl acetate having a proportion of vinyl acetate in the range from 2% by weight to 50% by weight. Lower proportions of vinyl acetate lead to the formation of rigid films, whereas higher proportions lead to greater adhesiveness of the polymer. Typical EVAs are solid at room temperature and have tensile elongation of up to 750%. In addition, EVAs are resistant to stress cracking. EVA has the following general formula (I):

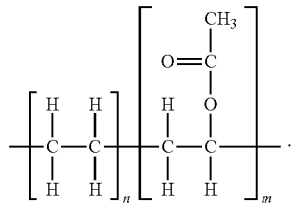

(formula (I))

EVA in the context of the present invention preferably has a density of 0.9 g/cm³ to 1.0 g/cm³ (according to ISO 1183). Yield stress according to ISO 527 is especially 4 to 12 MPa, preferably in the range from 5 MPa to 10 MPa, particularly from 5 to 8 MPa. Especially suitable are those EVAs which have a tensile strength (according to ISO 527) of more than 12 MPa, especially more than 15 MPa, and less than 50 MPa, especially less than 40 MPa, particularly of 25 MPa or less. Elongation at break (according to ISO 527) is especially >30% or >35%, particularly >40% or 45%, preferably >50%. The tensile modulus of elasticity is preferably in the range from 35 MPa to 120 MPa, particularly from 40 MPa to 100 MPa, preferably from 45 MPa to 90 MPa, especially from 50 MPa to 80 MPa. Suitable EVAs are sold, for example, by Axalta Coating Systems LLC under the Coathylene® CB 3547 trade name.

Polymethylmethacrylate (PMMA) is a synthetic transparent thermoplastic polymer having the following general structural formula (II):

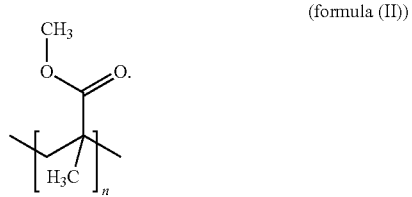

(formula (II))

The glass transition temperature, depending on the molar mass, is about 45° C. to 130° C. The softening temperature is preferably 80° C. to 120° C., especially 90° C. to 110° C. The thermoplastic copolymer is notable for its resistance to weathering, light and UV radiation.

PMMA in the context of the present invention preferably has a density of 0.9 to 1.5 g/cm³ (according to ISO 1183), especially of 1.0 g/cm³ to 1.25 g/cm³. Especially suitable are those PMMAs which have a tensile strength (according to ISO 527) of more than 30 MPa, preferably of more than 40 MPa, especially more than 50 MPa, and less than 90 MPa, especially less than 85 MPa, particularly of 80 MPa or less. Elongation at break (according to ISO 527) is especially <10%, particularly <8%, preferably <5%. The tensile modulus of elasticity is preferably in the range from 900 MPa to 5000 MPa, preferably from 1200 to 4500 MPa, especially from 2000 MPa to 4000 MPa. Suitable PMMAs are sold, for example, by Ter Hell Plastics GmbH, Bochum, Germany, under the trade name of 7M Plexiglas® pellets.

EEAMA is a terpolymer formed from ethylene, acrylic ester and maleic anhydride monomer units. EEAMA has a melting point of about 102° C., depending on the molar mass. It preferably has a relative density at 20° C. (DIN 53217/ISO 2811) of 1.0 g/cm³ or less and 0.85 g/cm³ or more. Suitable EEAMAs are sold, for example, under the Coathylene® TB3580 trade name by Axalta Coating Systems LLC.

Preferably, the composite material comprises essentially the hydrogen storage material and the matrix. The proportion by weight of the matrix based on the total weight of the composite material is preferably 10% by weight or less, especially 8% by weight or less, more preferably 5% by weight or less, and is preferably at least 1% by weight and especially at least 2% by weight to 3% by weight. It is desirable to minimize the proportion by weight of the matrix. Even though the matrix is capable of storing hydrogen, the hydrogen storage capacity is not as significant as that of the hydrogen storage material itself. However, the matrix is needed in order firstly to keep any oxidation of the hydrogen storage material that occurs at a low level or prevent it entirely and to assure coherence between the particles of the material.

It is preferable that the matrix comprises a polymer having low crystallinity. The crystallinity of the polymer can considerably alter the properties of a material. The properties of a semicrystalline material are determined both by the crystalline and the amorphous regions of the polymer. As a result, there is a certain relationship with composite materials, which are likewise formed from two or more substances. For example, the expansion capacity of the matrix decreases with increasing density.

The matrix may also take the form of prepregs. Prepreg is the English abbreviation of "preimpregnated fibers".

Prepregs are semifinished textile products preimpregnated with a polymer, which are cured thermally and under pressure for production of components. Suitable polymers are those having a highly viscous but unpolymerized thermoset polymer matrix. The polymers preferred according to the present invention may also take the form of a prepreg.

The fibers present in the prepreg may be present as a pure unidirectional layer, as a fabric or scrim. The prepregs may, in accordance with the invention, also be comminuted and be processed as flakes or shavings together with the hydrogenatable material to give a composite material.

In one version of the present invention, the polymer may take the form of a liquid which is contacted with the hydrogenatable material. One meaning of "liquid" here is that the polymer is melted. However, the invention also encompasses dissolution of the polymer in a suitable solvent, in which case the solvent is removed again after production of the composite material. However, it is also possible that the polymer takes the form of pellets which are mixed with the hydrogenatable material. As a result of the compaction of the composite material, the polymer softens, so as to form the matrix into which the hydrogenatable material is embedded. If the polymer is used in the form of particles, i.e. of pellets, these preferably have an $x_{50}$ particle size (volume-based particle size) in the range from 30 μm to 60 μm, especially of 40 μm to 45 μm. The $x_{90}$ particle size is especially 90 μm or less, preferably 80 μm or less.

The hydrogen storage means of the invention comprises, as well as the first region comprising the hydrogenatable material, at least one different, second region having one or more layers. One of these layers may, for example, be a heat-conducting layer. A heat-conducting layer may, in accordance with the invention, comprise at least one heat-conducting metal and/or graphite. The heat-conducting material is to have good thermal conductivity on the one hand, but on the other hand also a minimum weight, in order to minimize the total weight of the hydrogen storage means. The metal preferably has a thermal conductivity A of 100 W/(m·K) or more, especially of 120 W/(m·K) or more, preferably of 180 W/(m·K) or more, particularly of 200 or more. According to the invention, the heat-conducting metal may also be a metal alloy or a mixture of different metals. The heat-conducting metal is preferably selected from silver, copper, gold, aluminum and mixtures of these metals or alloys comprising these metals. Particular preference is given to silver, since it has a very high thermal conductivity of more than 400 W/(m·K). Preference is likewise given to aluminum, since, as well as the high thermal conductivity of 236 W/(m·K), it has a low density and hence a low weight.

According to the invention, graphite comprises both expanded and unexpanded graphite. Preference is given to using expanded graphite. Alternatively, it is also possible to use carbon nanotubes (single-wall, double-wall or multi-wall), since these likewise have very high thermal conductivity. Because of the high costs of the nanotubes, it is preferable to use expanded graphite or mixtures of expanded graphite and unexpanded graphite. If mixtures are present, based on weight, more unexpanded graphite is used than expanded graphite.

Natural graphite in ground form (unexpanded graphite) has poor adhesion in the composite material and can be processed to give a permanent, stable composite only with difficulty. Therefore, in the case of metal hydride-based hydrogen storage, preference is given to utilizing those graphite qualities that are based on expanded graphite. The latter is produced from natural graphite in particular and has a much lower density than unexpanded graphite, but has good adhesion in the composite, such that a stable composite material can be obtained. If, however, exclusively expanded graphite were to be used, the volume of the hydrogen storage means would become too great to be able to operate it economically. Therefore, preference is given to using mixtures of expanded and unexpanded graphite.

If the hydrogen storage means or the composite material and/or the composite article is compacted by means of pressing, expanded graphite forms an oriented layer which is able to conduct heat particularly efficiently. The graphite layers (hexagonal planes) in expanded graphite are shifted with respect to one another by the pressure on compression, such that lamellae or layers form. These hexagonal planes of graphite are then in a transverse arrangement (virtually at right angles with respect to the direction of pressure during an axial pressing operation), such that the hydrogen can then be introduced readily into the composite material and the heat can be conducted outward or inward efficiently. As a result, not just conduction of heat but also conduction of gas or conduction of fluid can be enabled.

Alternatively, the expanded graphite can be processed, for example, by means of calender rolling to give films. These films are then ground again. The flakes thus obtained can then be used as heat-conducting material. The rolling gives rise to a preferential direction in the carbon lattice here too, as a result of which particularly good onward conduction of heat and fluid is enabled.

Graphite and/or the at least one heat-conducting metal may be arranged in a first region directly adjoining a second layer. According to the invention, the first region comprising the composite material may take the form of a layer. Thus, for example, the first layer may directly adjoin a second layer comprising the composite material. More particularly, the hydrogen storage means comprises a plurality of first and a plurality of second layers arranged in alternation within the hydrogen storage means. It is also possible in accordance with the invention that the hydrogen storage means includes a third layer different than the first and second layers, which may be arranged between the first and second layers. Alternatively, it is also possible that two first layers are separated by a second layer and, subsequently, two first layers are separated by a third layer. It is thus possible that the third layer directly adjoins the first and/or second layer. As well as the three layers, it is also possible for further layers to be present in hydrogen storage means. In principle, the layers may be arranged in any sequence, provided that their respective functions at the appropriate positions are sensible for the operation of the hydrogen storage means.

Preference is given to using graphite as heat-conducting material, when a high-temperature hydride is present as hydrogenatable material in the material composite. In the case of low-temperature hydrides, preference is given to a heat-conducting metal, especially aluminum. This combination is preferred especially when the two layers directly adjoin one another. According to the invention, it is possible, for example, that a first layer which constitutes the first region, the material composite of the invention comprising a high-temperature hydride, directly adjoins a second layer comprising graphite. This second layer may then in turn directly adjoin a third layer comprising a heat-conducting metal, which then again adjoins a fourth layer comprising graphite. This fourth layer may then again be adjoined directly by a first layer comprising the material composite. Any desired layer sequences are possible in accordance with the invention. In the context of the present invention, "comprise" means that not only the materials mentioned but also further constituents may be present; preferably, however, "comprise" means "consist of".

Graphite and/or aluminum and/or other heat-conducting metals may take the form of granules, of powder or of a sheet or film. A sheet or film may already constitute a layer in the context of the present invention. However, it is also conceivable that 3-dimensional configurations are present, which form a layer which penetrates at least partly into the layer of the material composite, as a result of which it is possible to enable better removal and supply of heat. In particular, graphite, as well as thermal conductivity, also has good conduction of gas. However, aluminum has the better thermal conductivity compared to graphite.

For conduction of gas, the hydrogen storage means preferably has a porous layer. This may, for example, be a heat conduction layer comprising graphite, as described further up. According to the invention, a porous layer may also be a porous region in which the heat-conducting metal or else the hydrogenatable material is not densely compressed, such that conduction of gas (conduction of fluid) is readily possible.

The hydrogenatable material can absorb the hydrogen and, if required, release it again. In a preferred embodiment, the material comprises particulate materials in any 3-dimensional configuration, such as particles, pellets, fibers, preferably cut fibers, flakes and/or other geometries. More particularly, the material may also take the form of sheets or powder. In this case, the material does not necessarily have to have a homogeneous configuration. Instead, the configuration may be regular or irregular. Particles in the context of the present invention are, for example, virtually spherical particles, and likewise particles having an irregular and/or angular outward shape. The surface may be smooth, but it is also possible that the surface of the material is rough and/or has unevenness and/or depressions and/or elevations. According to the invention, a hydrogen storage means may comprise the material in just one specific 3-dimensional configuration, such that all particles of the material have the same spatial extent. However, it is also possible that a hydrogen storage means comprises the material in different configurations/geometries. By virtue of a multitude of different geometries or configurations of the material, the material can be used in a multitude of different hydrogen storage means.

Preferably, the material comprises hollow bodies, for example particles having one or more cavities and/or having a hollow shape, for example a hollow fiber or an extrusion body with a hollow channel. The term "hollow fiber" describes a cylindrical fiber having one or more continuous cavities in cross section. Through the use of a hollow fiber, it is possible to combine a plurality of hollow fibers to give a hollow fiber membrane, by means of which absorption and/or release of the hydrogen from the material can be facilitated because of the high porosity.

Preferably, the hydrogenatable material has a bimodal size distribution. In this way, a higher bulk density and hence a higher density of the hydrogenatable material in the hydrogen storage means can be enabled, which increases the hydrogen storage capacity, i.e. the amount of hydrogen which can be stored in the storage means.

According to the invention, the hydrogenatable material may comprise, preferably consist of, at least one hydrogenatable metal and/or at least one hydrogenatable metal alloy.

Other hydrogenatable materials used may be:
alkaline earth metal and alkali metal alanates,
alkaline earth metal and alkali metal borohydrides,
metal-organic frameworks (MOFs) and/or
clathrates,
and, of course, respective combinations of the respective materials.

According to the invention, the material may also include non-hydrogenatable metals or metal alloys.

According to the invention, the hydrogenatable material may comprise a low-temperature hydride and/or a high-temperature hydride. The term "hydride" refers to the hydrogenatable material, irrespective of whether it is in the hydrogenated form or the non-hydrogenated form. Low-temperature hydrides store hydrogen preferably within a temperature range between −55° C. and 180° C., especially between −20° C. and 150° C., particularly between 0° C. and 140° C. High-temperature hydrides store hydrogen preferably within a temperature range of 280° C. upward, especially 300° C. upward. At the temperatures mentioned, the hydrides cannot just store hydrogen but can also release it, i.e. are able to function within these temperature ranges.

Where 'hydrides' are described in this context, this is understood to mean the hydrogenatable material in its hydrogenated form and also in its non-hydrogenated form.

According to the invention, in the production of hydrogen storage means, it is possible to use hydrogenatable materials in their hydrogenated or non-hydrogenated form.

With regard to hydrides and their properties, reference is made in the context of the disclosure to tables 1 to 4 in S. Sakietuna et al., International Journal of Energy, 32 (2007), p. 1121-1140.

Hydrogen storage (hydrogenation) can be effected at room temperature. Hydrogenation is an exothermic reaction. The heat of reaction that arises can be removed. By contrast, for the dehydrogenation, energy has to be supplied to the hydride in the form of heat. Dehydrogenation is an endothermic reaction.

For example, it may be the case that a low-temperature hydride is used together with a high-temperature hydride. For instance, in one configuration, it may be the case that, for example, the low-temperature hydride and the high-temperature hydride are provided in a mixture in a layer of a second region. It is also possible for these each to be arranged separately in different layers or regions, especially also in different second regions. For example, it may be the case that a first region is arranged between these second regions. In a further configuration, a first region has a mixture of low- and high-temperature hydride distributed in the matrix. It is also possible that different first regions include either a low-temperature hydride or a high-temperature hydride.

Preferably, the hydrogenatable material comprises a metal selected from magnesium, titanium, iron, nickel, manganese, nickel, lanthanum, zirconium, vanadium, chromium, or a mixture of two or more of these metals. The hydrogenatable material may also include a metal alloy comprising at least one of the metals mentioned.

More preferably, the hydrogenatable material (hydrogen storage material) comprises at least one metal alloy capable of storing hydrogen and releasing it again at a temperature of 150° C. or less, especially within a temperature range from −20° C. to 140° C., especially from 0° C. to 100° C. The at least one metal alloy here is preferably selected from an alloy of the $AB_5$ type, the AB type and/or the $AB_2$ type. A and B here each denote different metals, where A and/or B are especially selected from the group comprising magnesium, titanium, iron, nickel, manganese, nickel, lanthanum, zirconium, vanadium and chromium. The indices represent the stoichiometric ratio of the metals in the particular alloy. According to the invention, the alloys here may be doped with extraneous atoms. According to the invention, the doping level may be up to 50 atom %, especially up to 40 atom % or up to 35 atom %, preferably up to 30 atom % or up to 25 atom %, particularly up to 20 atom % or up to 15 atom %, preferably up to 10 atom % or up to 5 atom %, of A and/or B. The doping can be effected, for example, with magnesium, titanium, iron, nickel, manganese, nickel, lanthanum or other lanthanides, zirconium, vanadium and/or chromium. The doping can be effected here with one or more different extraneous atoms. Alloys of the $AB_5$ type are readily activatable, meaning that the conditions needed for activation are similar to those in the operation of the hydrogen storage means. They additionally have a higher ductility than alloys of the AB or $AB_2$ type. Alloys of the $AB_2$ or of the AB type, by contrast, have higher mechanical stability and hardness compared to alloys of the $AB_5$ type. Mention may be made here by way of example of FeTi as an alloy of the AB type, $TiMn_2$ as an alloy of the $AB_2$ type and $LaNi_5$ as an alloy of the $AB_5$ type.

More preferably, the hydrogenatable material (hydrogen storage material) comprises a mixture of at least two hydrogenatable alloys, at least one alloy being of the $AB_5$ type and the second alloy being an alloy of the AB type and/or the $AB_2$ type. The proportion of the alloy of the $AB_5$ type is especially 1% by weight to 50% by weight, especially 2% by weight to 40% by weight, more preferably 5% by weight to 30% by weight and particularly 5% by weight to 20% by weight, based on the total weight of the hydrogenatable material.

The hydrogenatable material (hydrogen storage material) is preferably in particulate form (particles).

The particles especially have a particle size $x_{50}$ of 20 μm to 700 μm, preferably of 25 μm to 500 μm, particularly of 30 μm to 400 μm, especially of 50 μm to 300 μm. $x_{50}$ means that 50% of the particles have a median particle size equal to or less than the value mentioned. The particle size was determined by means of laser diffraction, but can also be effected by sieve analysis. The median particle size in the present case is the particle size based on weight, the particle size based on volume being the same in the present case. What is reported here is the particle size of the hydrogenatable material before it is subjected to hydrogenation for the first time. During the storage of hydrogen, stresses occur within the material, which can lead to a reduction in the $x_{50}$ particle size over several cycles.

It has been found that, surprisingly, materials of this size exhibit particularly good properties in hydrogen storage. In the storage and release of hydrogen, there is expansion (in the course of hydrogenation) or shrinkage (in the course of dehydrogenation) of the material. This change in volume may be up to 30%. As a result, mechanical stresses occur in the particles of the hydrogenatable material, i.e. in the hydrogen storage material. In the course of repeated charging and discharging (hydrogenating and dehydrogenating) with hydrogen, it has been found that the particles break up. If the hydrogenatable material, then, in particular, has a particle size of less than 25 μm, particularly of less than 30 μm and especially of less than 50 μm, a fine powder forms during use, and may no longer be able to effectively store hydrogen. Moreover, there can be a change in the distribution of the material in the hydrogen storage means itself. Beds having particles of the material with very small diameters of a few nanometers can collect at the lowest point in the hydrogen storage means. In the case of charging with hydrogen (hydrogenation), high mechanical stresses at the walls of the hydrogen storage means occur at this point because of the expansion of the hydrogen storage material. Through the choice of suitable particle sizes for the material, it is possible to at least partly avoid this. On the other hand, a smaller particle size gives rise to a greater number of contact points where the particles interact with the matrix and adhere therein, such that an improved stability arises therefrom, which cannot be achieved in the case of particles having a size of more than 700 μm, especially of more than 500 μm.

The terms "material", "hydrogenatable material" and "hydrogen storage material" are used synonymously in the present application.

In a further configuration, the hydrogen storage means has a high-temperature hydride vessel comprising high-temperature hydrides and a low-temperature vessel comprising low-temperature hydrides. The high-temperature hydrides may generate temperatures of more than 350° C., which have to be dissipated. This heat is released very rapidly and can be utilized, for example, for heating of a component associated with the hydrogen storage means. High-temperature hydrides utilized may, for example, be metal powders based on magnesium. The low-temperature hydride, by contrast, preferably has a temperature within a range preferably between −55° C. and 155° C., especially preferably within a temperature range between 0° C. and 140° C., in which it can store hydrogen and release it again. A low-temperature hydride is, for example, $Ti_{0.8}Zr_{0.2}CrMn$ or $Ti_{0.98}Zr_{0.02}V_{0.43}Cr_{0.05}Mn_{1.2}$. One configuration envisages transfer of hydrogen from the high-temperature hydride vessel to the low-temperature hydride vessel or vice versa, and storage therein in each case, where the temperature is within the range in which storage can take place. By way of example and within the scope of the disclosure, reference is hereby made for this purpose to DE 36 39 545 C1.

In a further configuration again, for example, a mixture of FeTi and MgLn is utilized, for example in a blank produced, in order to be able to utilize different temperature ranges and also pressure ranges in a hydrogen storage means and the operation thereof. Thus, it is possible to utilize low- and mid-temperature hydrogen storage means together in a pressure vessel, i.e. two hydrogen storage means which can be utilized in different temperature ranges. Preferably, these two temperature ranges have only an overlap of 20° C. at most. They may alternatively have a gap with respect to one another, preferably of less than 50° C. For temperature control, here and in other configurations, preference is given to utilizing a water jacket which flows through the pressure vessel and surrounds blanks, into which the composite material is preferably formed.

In addition, at least one component of the composite material, for example one or more intermediate layers of aluminum, may have been produced in a sintering process. In a sintering process, fine-grain ceramic or metallic substances are heated, but the temperatures remain below the melting temperature of the main components, such that the shape of the workpiece is conserved. There is generally shrinkage because the particles of the starting material become compacted and pore spaces are filled. A basic distinction is made between solid phase sintering and liquid phase sintering, in which there is also melting. The thermal treatment of sintering converts a fine- or coarse-grain green body which has been formed in a preceding process step, for example by means of extrusion, to a solid workpiece. It is only as a result of the thermal treatment that the sintering product receives its ultimate properties, such as hardness, strength or thermal conductivity, which are required in the particular use. For example, it is possible in this way to create an open-pore matrix into which the hydrogenatable material is admitted. It is also possible in this way to create channel structures which, for example, are gas-conducting and are used in the hydrogen storage means.

It is preferable that the hydrogenatable material preferably has a proportion of greater than 50% to 98% by volume and the matrix preferably has a proportion of at least 2% to 50% by volume of the composite material. The proportion of the percentage by volume of the hydrogenatable material and the matrix can be determined by known test methods and detection methods, for example with the aid of a scanning electron microscope. It is likewise possible to use a light microscope. Preference is given to using an imaging program, with automatic evaluation by means of a computer program.

In a preferred embodiment, the matrix comprises, as well as one polymer, additionally carbon in any polymorph. The carbon is preferably in the form of graphite, especially expanded natural graphite. In this way, it is possible to better dissipate the heat that arises on absorption and/or release of the hydrogen.

One component, for example the carbon, can also be used as division between materials which could otherwise not be used together with one another in a hydrogen storage means. Thus, it is possible by means of a barrier through the matrix to use aluminum and also magnesium together.

It is preferable that the matrix and/or a layer includes a mixture of different carbon polymorphs comprising, for example, expanded natural graphite as one of the carbon polymorphs. Preference is given to using unexpanded graphite together with expanded natural graphite, in which case more unexpanded graphite than expanded graphite is used on the basis of weight. More particularly, the matrix may include expanded natural graphite with, for example, a hydrogenatable material arranged therein. Further carbon polymorphs include, for example, single-wall, double-wall or multiwall nanotubes, graphenes and fullerenes.

Preferably, the composite material has an elastic property in at least one region. In this way, it is possible to ensure that, for example, on absorption of hydrogen, the hydrogenatable material can expand without damaging or overstressing the composite material.

In a preferred embodiment, the hydrogen storage means has alternating first and second regions comprising a matrix on the one hand and comprising one or more layers on the other hand. The alternating arrangement of the first and second regions can, for example, counteract separation of the layers of the second regions by the first regions. By means of the matrix of the first regions, it is possible, for example, to firmly position the arrangement of the first and second regions. In this way, as a fluid flows through the hydrogen storage means, for example, the light constituents of the layers of the second region can be flushed downward, for example, since these would be retained by the matrix of the adjoining first layers.

It is preferable that the first region is arranged in an inner region of the hydrogen storage means and the second region in an outer region of the hydrogen storage means. In one configuration, the inner region may be, in the axial direction of the hydrogen storage means, for example, the middle of the hydrogen storage means. In addition, the inner region may also, viewed in the radial direction of the hydrogen storage means, be just a region along the longitudinal axis of the hydrogen storage means, such that the matrix is fully enclosed by the layers. In addition, it is possible that first regions are arranged in an outer region of the hydrogen storage means and second regions in an interior of the hydrogen storage means. It is also possible that first and second regions are arranged at different sites in the hydrogen storage means. Preferably, first and second regions may also be arranged with utilization of optimization calculations. In this case, one criterion may be thermal conductivity, another criterion may be gas permeability, and another criterion again may be hydrogen storage capacity. For example, according to the size dimensions, it may be advantageous to provide first and second regions with different respective densities from the inside outward. It is also possible for first and second regions each to have a different gas permeability. Therefore, it may be advisable, for example, that one region having greater gas permeability is arranged in an outer region of the hydrogen storage means than a less gas-permeable region in an inner region.

In addition, it may be the case that various composite materials are used together in a hydrogen storage means. For example, it is possible to utilize composite materials having differences with regard to the first and second regions combined in the hydrogen storage means. It is also possible here to use proposed composite materials with other hydrogenatable laminas and/or matrices which, for example, each form a compacted material composite. This can be effected, for example, by means of compacted sheets stackable one on top of another. An alternative option is joint compaction. For example, first and second regions can be arranged as proposed, with only laminas or only matrices adjoining them. Such an arrangement can then be compacted in order to form a composite material.

In one configuration, the first and second regions are arranged alongside one another along a plane in the composite material. It is also possible here for geometric forms such as core-shell structures to be formed with the first or the second region as shell or as core. It is also possible for other geometric structures to be created by the arrangement of first and second regions in the composite material. In this case, the first and second regions may be arranged horizontally or else vertically. It is also possible in this way for different expansion properties of first and second regions to be combined with one another, for example hence stabilizing the entire composite material. In one configuration, for example, the expansion properties of the first and second regions may supplement one another such that the entire composite material retains approximately equal dimensions, preferably irrespective of whether hydrogen is being absorbed or released again.

The compaction can incidentally be effected under the simultaneous influence of heat and/or, for example, of a gas. It is also possible, for example, to provide suction, for example for removal of a binder which may be arranged in a first and/or second region by suction. The binder may, for example, be removed completely or else only partially from the composite material, for example to create a porous structure. For example, a binder may be arranged in one of the two regions and no binder in the other of the two regions. It is also possible to use different binders; for example, a different binder is provided in the first region than in the second region.

The invention further relates to a process for producing a hydrogen storage means, preferably a hydrogen storage means as described above or else below, wherein a first region of the hydrogen storage means is formed by means of a matrix into which a hydrogenatable material is embedded, and a second region of the hydrogen storage means is formed by means of one or more layers, wherein a layer is produced using preferably essentially a single material or a homogenized material mixture.

In a preferred configuration, the first and second regions are each manufactured independently of the other and then the two regions are combined.

It is preferable that first one of the two first and second regions is produced and then the other region is produced. For example, one region may at least partly surround the other region, for example even enclose it.

In a further configuration again, the two regions are produced simultaneously.

Preferably, the first and second regions are compressed together and form a composite region. The compression can be effected axially, for example, with the aid of an upper ram and a lower ram by pressure. In addition, the compression can be effected via isostatic pressing. The isostatic press method is based on the physical law that the pressure in liquids and gases propagates uniformly in all directions and generates forces on the areas subjected thereto that are directly proportional to these areas. The first and second regions can be introduced into the pressure vessel of a pressing system, for example, in a rubber mold. The pressure that acts on the rubber mold on all sides via the liquid in the pressure vessel compresses the enclosed first and second regions in a uniform manner. It is also possible to insert a preform comprising the first and second regions into the isostatic press, for example into a liquid. By applying high pressures, preferably within a range from 500 to 6000 bar, the composite material can be produced. The high pressures in isostatic pressing permit, for example, the creation of new material properties in the composite material.

The invention further relates to an apparatus for producing a hydrogen storage means, preferably a hydrogen storage means as described above, more preferably by a process as described above, wherein the apparatus has a station for joining of first and second regions of the hydrogen storage means, wherein the first region comprises a matrix comprising hydrogenatable material arranged in the matrix and the second region comprises layers each having one of the following principal functions: hydrogen storage, heat conduction or gas conduction.

In a preferred configuration, the hydrogenatable material is introduced into the hydrogen storage means so as to give a helical structure of the matrix and/or the layer.

The term "helical filling" or "helical structure" in this context describes an arrangement of the material by a filling apparatus which swivels its outlet orifice in a circle for discharge of the hydrogenatable material, so as to form a helical structure. In addition, the filling apparatus may swivel its outlet orifice merely back and forth, such that the discharged material takes the form of a wave. The hydrogenatable material can, for example, also be introduced into the matrix by means of slip casting or extrusion. Within the scope of the disclosure of the invention, reference is made for this purpose to the relevant content of DE 10 2014 006 379 and DE 10 2014 006 367.

It is preferable that the hydrogenatable material is arranged variably within the hydrogen storage means, in the matrix and the layers. What is meant by "variably" is that the hydrogenatable material in the matrix and in the layers has a gradient, for example such that there is a slope or a rise in the concentration/proportion of the hydrogenatable material, for example depending on the fluid which flows through the hydrogen storage means.

In respect of the laminas which form the layers in the composite material, it is preferably the case that these comprise one first material and one second material at separate locations from one another, each of which form separate laminas adjacent to one another, preferably abutting one another, the first material comprising a primarily hydrogen-storing material and the second material comprising a primarily heat-conducting material, with the primarily heat-conducting material extending from an interior of the hydrogen storage means to an exterior of the hydrogen storage means. It is preferably the case that a gradient is formed between the first and second laminas, along which a transition from the first to the second lamina is accomplished.

The aim is preferably, for example, a cylindrical overall geometry of the composite material, with provision of an inlet and an outlet for gas. Through conduction of gas into the layers, the hydrogen can be absorbed or else released. Preferably, therefore, there is a heat-conducting layer extending not only perpendicularly to a cylinder axis from the inside outward. Instead, it is also possible for heat-conducting layers to extend through the composite material at a non-perpendicular angle with respect to a cylinder axis. The heat-conducting layer and the alignment thereof can, for example, be effected via a corresponding arrangement of aluminum particles.

It may also be the case that the hydrogen storage means has components in the form of a core-shell structure, in which the core comprises a first material and the shell a different second material, the first material and/or the second material comprising a hydrogen-storing material. This is the case, for example, preferably in the layers of the composite material. In one configuration, the second material of the shell comprises a polymer, which is configured so as to be at least hydrogen-permeable. In a further configuration, the core comprises a heat-conducting material and the shell a hydrogen-storing material. It may on the other hand be the case that the core comprises a primarily hydrogen-storing material and the shell a primarily heat-conducting material, the heat-conducting material being hydrogen-permeable.

In addition, in the process for producing the hydrogen storage means, separate laminas of a hydrogen-storing material and a heat-conducting material may be introduced into a press mold and these may be compressed with one another to produce a sandwich structure, wherein the heat-conducting material on use of the sandwich structure as hydrogen storage means assumes the task of heat conduction, preferably in a radial direction of the hydrogen storage means. Between the separate laminas and/or adjacent thereto may be arranged, for example, one or more matrices, such that the composite material obtains first and second regions as a result.

For example, it may be the case that a metal powder and/or normal natural graphite is utilized as heat-conducting material, in which case, when the normal natural graphite is used, preferably the lenticular particles thereof are preferably aligned horizontally on filling, such that it is possible to utilize heat conduction in the direction of an aligned hexagonal lattice structure in the sandwich structure.

In addition, it may be the case, additionally or alternatively, that one or more films composed of a rolled expanded graphite, flakes of a rolled expanded graphite and/or a graphite fabric are introduced into the sandwich structure as heat-conducting material.

In a further configuration, one or more laminas of a material that remains porous are introduced into the sandwich structure as gas-guiding layers and compressed therewith. Preferably, a plurality of sandwich structures are pressed separately from one another then arranged in a common vessel.

Figure 2:
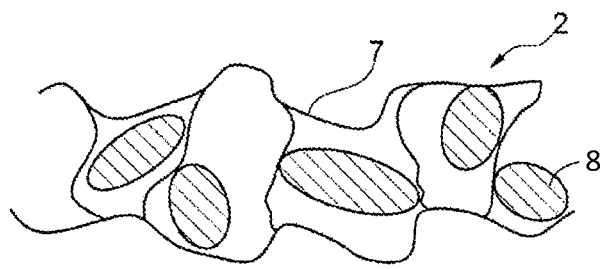
Figure 3:
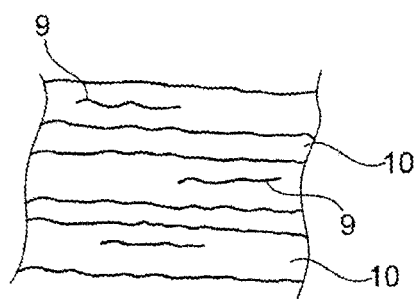
Figure 4:
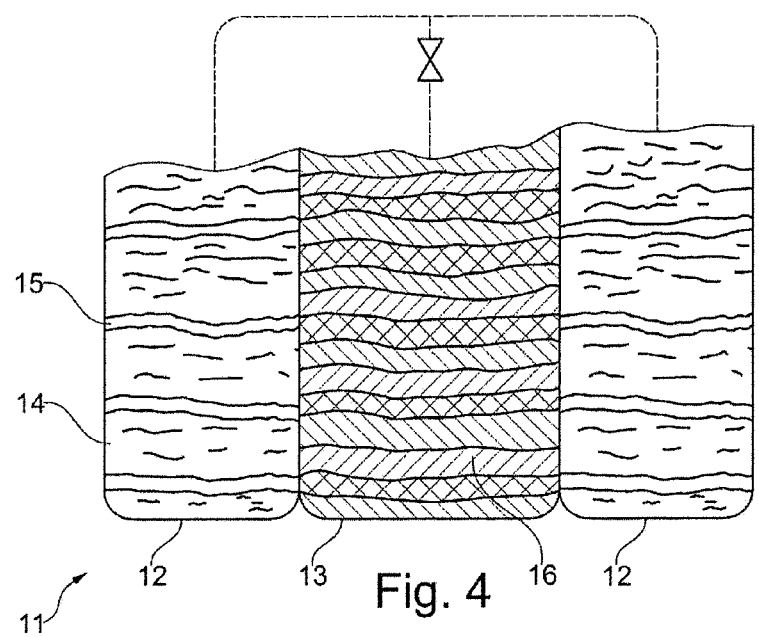
Figure 5:
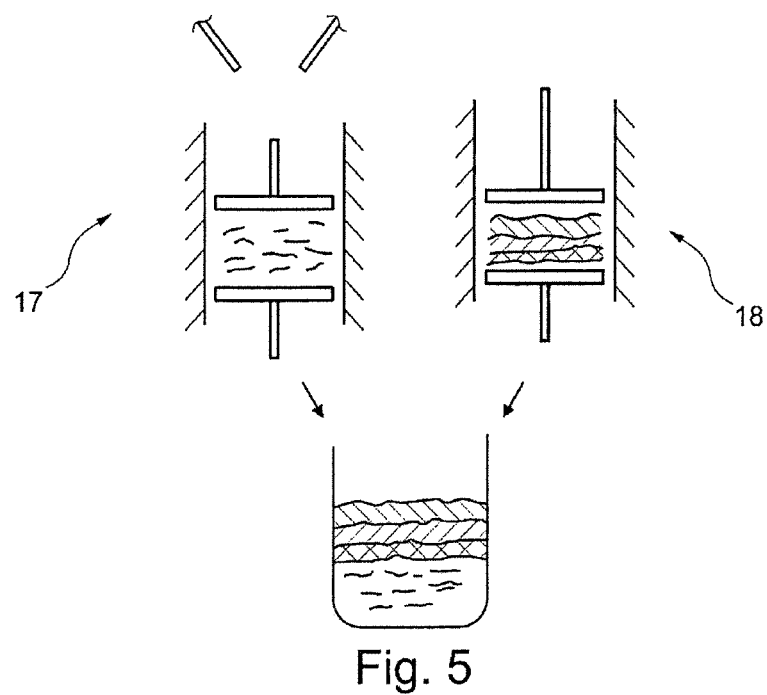

Further advantageous configurations and also features are apparent from the figures which follow and the corresponding description. The individual features that are apparent from the figures and the description are merely illustrative and not restricted to the particular configuration. Instead, one or more features from one or more figures can be combined with other features from other figures and also from the above description to give further configurations. Therefore, the features are specified not in a restrictive manner but merely by way of example. The figures show:

FIG. 1 a first detail from a first hydrogen storage means, having a first region arranged in the middle and a second region arranged around the first region, FIG. 2 a detail from a matrix of the first region of the first hydrogen storage means, FIG. 3 a composite material with first regions within the second regions, FIG. 4 a hydrogen storage means with a low-temperature region and a high-temperature region, and FIG. 5 an illustrative manufacture of a hydrogen storage means with first and second regions.

FIG. 1 shows, in a schematic view, a first hydrogen storage means 1 having a first region 2 arranged in the middle. The first region 2 has a matrix into which a hydrogenatable material is embedded. The matrix is preferably not only capable of locally positioning and at least substantially fixing the hydrogenatable material. In addition, it is possible for the matrix, for example, to provide a certain thermal conductivity but possibly also porosity. For example, an expanded natural graphite may be utilized as matrix, into which particles or the like are embedded. As well as hydrogen storage, the matrix may thus also have thermal conductivity. The particles can be fixed via the matrix. These may also have a certain freedom of movement, which is restricted, for example, to a pore. It is alternatively possible, for example, to provide a closed porosity and to enclose in the closed pores, for example, particles having hydrogen storage capacity, for example. A second region 3 is formed around the first region 1, preferably as a completely surrounding ring. It is alternatively possible to provide apertures, gaps, breaks or else orifices. The second region 3 has, for example, an alternation of various layers each having different primary functions, namely hydrogen storage, heat conduction and gas conduction. For example, a first layer 4 may assure gas permeability for the hydrogen, such that it can either flow through, for example, as far as the first region 2 without high pressure drops or flow away from the first region 2. A second layer 5 in turn is capable of distributing, especially of dissipating, the heat that arises, preferably from an interior of the hydrogen storage means 1 to an exterior. The heat is conducted preferably by means of conduction, and heat transfer can additionally also be affected by radiative effects, etc. Although the layers are arranged in roughly parallel sheetlike form, this is just one possible configuration. It is likewise possible for the heat-conducting layer also to extend, for example, into the gas-conducting layer, and likewise into the hydrogen-storing layer 6. As well as extending horizontally, the layer can also extend vertically. It is also possible for a layer to have a vertical and a horizontal component. The composite material thus formed can be pressed altogether or else successively.

FIG. 2 shows a detail from a matrix 7 of the first region 2 of the hydrogen storage means from FIG. 1 in a schematic view. The matrix 7 has, indicated in schematic form, for example, embedded particles 8. These may, for example, also be granules. The matrix preferably has a certain expansion capacity, preferably elastic capacity. This may serve to leave the particles 8 in their position when they change volume because of hydrogen storage or hydrogen release.

FIG. 3 shows a further working example of a composite material, in which first regions 9 and second regions 10 are present in a mixture. More particularly, the first regions are inserted into the second regions 10, preferably into one of the different layers of the second region. This can be achieved, for example, by successive filling with different materials into a cavity, the filling then being pressed and the composite material being formed.

FIG. 4 shows, by way of example, a hydrogen storage means 11 with a low-temperature hydride region 12 and a high-temperature hydride region 13. The latter is arranged in the middle and is preferably surrounded in the hydrogen storage means 11 by the low-temperature hydride region 12. While, for example, the low-temperature hydride region 12 has, for example, first regions 14 and second regions 15 in each case, for example, the high-temperature region is provided only with layers 16 that rest one on top of another. Inverse arrangements of the two regions are also possible.

FIG. 5 shows, by way of example, a schematic production of a first region 17 and a second region 18, each separately from one another. These are also compacted separately and then combined, in order to form a composite material in a vessel.

The present application therefore encompasses a hydrogen storage means comprising a composite material comprising a hydrogenatable material, wherein the composite material comprises, in a first region, at least one matrix into which the hydrogenatable material is embedded, and comprises, in another, second region, one or more layers, wherein one of the layers has one of the following principal functions: hydrogen storage, heat conduction or gas conduction. Preferably, the matrix and/or a layer each comprise carbon. More particularly, the matrix and/or a layer comprise a mixture of various carbon polymorphs including expanded natural graphite as one of the carbon polymorphs.

Preferably, the composite material has an elastic property in at least one region. More particularly, the hydrogen storage means has alternating first and second regions comprising a matrix on the one hand and comprising one or more layers on the other hand.

In this case, the first region may be arranged in an inner region of the hydrogen storage means and the second region in an outer region of the hydrogen storage means.

The hydrogen storage means of the invention may comprise a low-temperature hydride and a high-temperature hydride.

In a further embodiment, the object underlying the present invention is achieved by a process for producing a hydrogen storage means, wherein a first region of the hydrogen storage means is formed by means of a matrix into which a hydrogenatable material is embedded, and a second region of the hydrogen storage means is formed by means of one or more layers, wherein a layer is produced using preferably essentially a single material or a homogenized material mixture. Preferably, the first and second regions are each manufactured independently of the other and then the two regions are combined. It is also possible that first one of the two first and second regions is produced and then the other region is produced with inclusion of the region already produced.

Preferably, the first and second regions are compressed together and form a composite region.

In a further embodiment, the object underlying the present invention is achieved by an apparatus for producing a hydrogen storage means, preferably a hydrogen storage means and especially preferably by a process as described above, wherein the apparatus has a station for joining of first and second regions of the hydrogen storage means, wherein the first region comprises a matrix comprising hydrogenatable material arranged in the matrix and the second region comprises layers each having one of the following principal functions: hydrogen storage, heat conduction or gas conduction.

This apparatus is preferably configured such that the hydrogenatable material can be introduced into the matrix and/or layer in a helical filling and the hydrogenatable material is arranged variably within the hydrogen storage means, especially in the matrix and the layers.

The invention claimed is:

1. A hydrogen storage means comprising a composite material comprising a hydrogenatable material, wherein the composite material comprises, in a first region, at least one matrix comprising at least one polymer into which the hydrogenatable material is embedded, and comprises, in another, second region, one or more layers, wherein at least one of the layers has one of the following principal functions:
hydrogen storage, heat conduction or gas conduction and wherein the first and second regions are compressed together and form a composite region by applying high pressures within a range of 500 to 6000 bar so that the composite material is produced.

2. The hydrogen storage means as claimed in claim 1, wherein the matrix further comprises carbon, the matrix and/or a layer comprising a mixture of various carbon polymorphs including expanded natural graphite as one of the carbon polymorphs.

3. The hydrogen storage means as claimed in claim 1, wherein the second region comprises at least one layer comprising a heat-conducting material.

4. The hydrogen storage means as claimed in claim 1, wherein the heat-conducting material comprises a metal or a metal alloy.

5. The hydrogen storage means as claimed in claim 2, wherein the carbon takes the form of natural expanded graphite.

6. The hydrogen storage means as claimed in claim 1, wherein the polymer has a density in the range from 0.7 g/cm$^3$ to 1.3 g/cm$^3$.

7. The hydrogen storage means as claimed in claim 1, wherein the polymer has a tensile strength in the range from 10 MPa to 100 MPa.

8. The hydrogen storage means as claimed in claim 1, wherein the polymer is selected from the group comprising EVA, PMMA, EEAMA and mixtures of these polymers.

9. The hydrogen storage means as claimed in claim 1, wherein it has alternating first and second regions comprioing a matrix and comprising one or more layers and/or the first region is arranged in an inner region of the hydrogen storage means and the second region in an outer region of the hydrogen storage means.

10. The hydrogen storage means as claimed in claim 1, wherein it comprises a low-temperature hydride and/or a high-temperature hydride as hydrogenatable material.

11. The hydrogen storage means as claimed in claim 1, wherein the hydrogenatable material is arranged variably in the matrix and/or in the layers.

12. A process for producing a hydrogen storage means as claimed in claim 1, wherein a first region of the hydrogen storage means is formed matrix comprising at least one polymer into which a hydrogenatable material is embedded, and a second region of the hydrogen storage means is formed by one or more layers, wherein a layer is produced using preferably essentially a single material or a homogenized material mixture and wherein the first and second regions are compressed together and form a composite region by applying high pressures within a range of 500 to 6000 bar so that the composite material is produced.

13. The process as claimed in claim 12, wherein the first and second regions are each manufactured independently of the other and then the two regions are combined.

14. The process as claimed in claim 12, wherein first one of the two first and second regions is produced and then the other region is produced with inclusion of the region already produced.

15. An apparatus for producing a hydrogen storage means, comprising a composite material comprising a hydrogenatable material, wherein the composite material comprises, in a first region, at least one matrix comprising at least one polymer into which the hydrogenatable material is embedded, and comprises, in another, second region, one or more layers, wherein at least one of the layers has one of the following principal functions: hydrogen storage, heat conduction or gas conduction by a process as claimed in claim 12, wherein the apparatus has a station for joining of first and second regions of the hydrogen storage means by compressing the first and second regions together and form a composite region by applying high pressures within a range of 500 to 6000 bar so that the composite material is produced, wherein the first region comprises a matrix comprising hydrogenatable material arranged in the matrix and the second region comprises layers each having one of the following principal functions: hydrogen storage, heat conduction or gas conduction.

16. The apparatus as claimed in claim 15, wherein the apparatus is configured such that the hydrogenatable material can be introduced into the matrix and/or layer in a helical filling.

17. The apparatus as claimed in claim 15, wherein the apparatus is configured such that the hydrogenatable material is arranged variably within the hydrogen storage means, especially in the matrix and the layers.

* * * * *

UNITED STATES PATENT AND TRADEMARK OFFICE
CERTIFICATE OF CORRECTION

PATENT NO. : 11,142,454 B2  
APPLICATION NO. : 15/307243  
DATED : October 12, 2021  
INVENTOR(S) : Antonio Casellas et al.

Page 1 of 1

It is certified that error appears in the above-identified patent and that said Letters Patent is hereby corrected as shown below:

In the Claims

Column 19, Lines 49-50, Claim 9, "comprioing" should be --comprising--.

Column 20, Line 9, Claim 12, "formed matrix" should be --formed a matrix--.

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*